United States Patent
Beech, Jr. et al.

(10) Patent No.: US 7,462,211 B2
(45) Date of Patent: Dec. 9, 2008

(54) GAS-SOLIDS SEPARATION DEVICE AND METHOD

(75) Inventors: James H. Beech, Jr., Kingwood, TX (US); Richard E. Walter, Long Valley, NJ (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 573 days.

(21) Appl. No.: 11/206,891

(22) Filed: Aug. 18, 2005

(65) Prior Publication Data

US 2007/0004949 A1    Jan. 4, 2007

Related U.S. Application Data

(60) Provisional application No. 60/695,734, filed on Jun. 29, 2005.

(51) Int. Cl.
*B01D 45/12* (2006.01)

(52) U.S. Cl. .................. 55/343; 55/345; 55/349; 55/385.1; 422/147; 422/187; 208/113

(58) Field of Classification Search .......... 55/343, 55/345, 346, 349, 385.1; 422/139, 147, 187; 208/113
See application file for complete search history.

(56) References Cited

U.S. PATENT DOCUMENTS 2,438,439 A * 3/1948 Hemminger ............ 208/157
4,556,479 A 12/1985 Mauleon et al.
4,863,500 A 9/1989 Rombout et al.
5,681,450 A 10/1997 Chitnis et al. ............ 208/113
5,690,709 A 11/1997 Barnes ..................... 55/348
5,770,045 A * 6/1998 Gosling et al. ........... 208/137
6,324,895 B1 12/2001 Chitnis et al. ............ 73/28.04
6,551,565 B2 4/2003 Confuorto et al. ........ 423/239
6,673,133 B2 1/2004 Sechrist et al. ............ 55/348
6,797,026 B2 9/2004 Sechrist et al. ............ 55/348
6,797,851 B2 9/2004 Martens et al. ........... 585/640
2002/0068031 A1 6/2002 Confuorto et al.

FOREIGN PATENT DOCUMENTS

WO    WO 2005/002711    1/2005

OTHER PUBLICATIONS

"Third-Stage Cyclone Separators Offer Alternatives for Particulate Recovery (Third-Stage Cyclones)", World Refining, (Jan.-Feb. 2003), vol. 13, No. 1, pp. 38(4).

* cited by examiner

*Primary Examiner*—Robert A Hopkins

(57) ABSTRACT

A multi-stage gas-solids separator having at least 4 stages is configured so that the penultimate stage of separators is operated in an underflow condition. The underflow from the penultimate stage is used as the input flow for the final stage of separators. The multi-stage separator is preferably composed of cyclone separators, with the final two stages of separators housed in external disengaging vessels.

25 Claims, 3 Drawing Sheets

GAS-SOLIDS SEPARATION DEVICE AND METHOD

CROSS REFERENCE TO RELATED APPLICATIONS

This application claims the benefit of Provisional Application No. 60/695,734 filed Jun. 29, 2005, the disclosure of which is fully incorporated herein by reference.

FIELD OF THE INVENTION

This invention is directed to an apparatus and method for separating solid catalyst particles from a gas-solids flow. This invention is in particular directed to an apparatus and method that make use of a reaction system having 2 or more stages of separators external to the reactor.

BACKGROUND OF THE INVENTION

Fluid-solid reaction systems, such as gas-solids reaction systems, often require the solids to be retained in early stages of the reaction system while the vapor product, essentially free of solids, is processed in downstream equipment. It is desirable in these systems that the solids be as completely removed as possible from the vapor before transferring the vapor to the downstream equipment. High solids retention in the early stages of the reaction system is desirable if the solids may contaminate the vapor product or downstream vapor process handling systems, and/or increase the capital and operating costs of downstream particulate capture devices such as wet gas scrubbers, electrostatic precipitators, or filters. Additionally, in reaction systems that use small particle catalysts, the loss of catalyst particles during operation means that additional catalyst has to be added during operation to make up for the catalyst loss. Particularly in cases where the cost of catalyst is high, even marginal improvements in solid particle retention can lead to substantial reductions in operating costs. Therefore, improvements in high efficiency solids/vapor separation systems are of particular interest.

One method for separating solids from a gas-solids flow is to pass the gas-solids flow through one or more cyclone separators. For example, cyclone separators are conventionally used to separate particles from gas-solids flows in fluidized bed reactor systems such as FCC reactors and oxygenate-to-olefin reactors. In these systems, cyclone separators can be arranged in "stages" so that the lower density or gas output of a first cyclone separator stage becomes the input for a second cyclone separator stage.

Although the cyclone separators can be arranged in stages to improve efficiency, in practice the number of stages is limited by constraints on the input and output flows of the cyclones. Once the majority of solids have been removed from a gas flow, the remaining solids in the flow may not be sufficient to allow a conventional cyclone separator to operate at full efficiency. In particular, it is difficult to design a conventional multistage cyclone separator having three or more stages, as the amount of solids in the input flow for any third or later cyclone stages is often too low for fully efficient operation of a conventional cyclone. Due to the low rate of solid catalyst particle flow, the required diameter of the final third or fourth cyclone stage dipleg in a conventional multistage separator at a typical design dipleg catalyst flux of 150 lb/ft$^2$*sec (6.4 kg/m$^2$*sec) can be a ½ inch (1.2 cm) or less. At such a dipleg diameter, the dipleg is prone to catalyst bridging or compaction. Catalyst bridging and/or compaction prevents outflow of catalyst from the cyclone stage and therefore causes poor separation efficiency. However, if a larger diameter dipleg is used it will potentially result in a very long solids residience time in the dipleg which will potentially be sufficient to defluidize the catalyst in the dipleg and thus cause the dipleg to not discharge the solids from the dipleg. Also the dipleg potentially may not seal properly at such a low flow of solids since gas could flow back into the cyclone through the dipleg, which also reduces the separation efficiency.

In spite of the above difficulties, multi-stage separators having third and/or fourth stage separators can be desirable for high cost catalysts in order to minimize catalyst losses. Additionally, the catalyst remaining in a gas flow after a second separator stage is typically rich in fine particles, which are often desirable to retain in a fluidized bed system as the fine particles improve the fluidization properties of the system.

U.S. Pat. No. 5,690,709 to Barnes describes a separator for removing particles from a gas stream. The separator can be used as a third stage separator and a fourth stage separator in a multi-stage separator for removing particles from a gas flow exiting the regenerator of an FCC reactor. The third stage separators are operated with an underflow that includes up to 2.5% of the gas entering the separators. The underflow of the third stage separator is fed into the inlet of the fourth stage separator, while an underflow of the fourth stage separator is captured in a storage vessel for eventual disposal of any collected particles. The gas output of the fourth stage separator is sent to a waste heat recovery system.

U.S. Pat. No. 6,673,133 to Sechrist et al. describes using third stage cyclones located in a separate vessel for further separating particles from a gas flow, such as the exit gas flow from a regenerator.

What is needed is an improved process and/or apparatus for removing solid particles in gas-solids reactors operating in a hydrocarbon rich vapor environment and also a process for returning the collected particles back into the reactor and/or the regenerator, such as in reaction systems that use molecular sieve type catalysts. The process and/or apparatus should allow for improved particle retention, including improved fine particle retention. The process and apparatus should also maintain or improve the efficiency of the reaction system for producing the desired reaction product. Additionally, the process and apparatus should allow the additionally retained particles to be returned back to the reactor for further use.

SUMMARY OF THE INVENTION

This invention provides a method and apparatus for separating solids from a gas flow in a gas-solids reaction system. This is accomplished in part by a method and apparatus that make use of a reaction system having two or more stages of separators that are external to the reactor. In various embodiments, one of the external separator stages is operated in an underflow condition. The higher density output of this underflow stage is used as the input for another external separator stage. The external separator stages are used to recover additional catalyst for return to the reaction system, such as by returning the catalyst to the reactor or regenerator, while minimizing or preventing any loss of the desired hydrocarbon reaction product.

In an embodiment, the invention provides a method for separating solids from a gas-solids flow. The method begins by flowing a gas-solids flow comprising a hydrocarbon gas from a reactor into a separation volume, the separation volume being external to the reactor. The gas-solids flow is separated into a first flow portion and a second flow portion, the first flow portion comprising at least 0.5% of the gas in the gas-solids flow and having a higher density than the second flow portion. This first flow portion is separated into a third flow portion and fourth flow portion, the third flow portion having a higher density than the fourth flow portion, with the temperature of the first flow portion, second flow portion, and fourth flow portion being maintained at 250° F. or greater. After separating the first flow portion, the fourth flow portion is merged with the second flow portion. Additionally, the solids of the third flow portion are captured in a retaining volume. These captured solids are then transferred from the retaining volume to the reactor.

In another embodiment, the invention provides an apparatus for separating solids from a gas flow. The apparatus includes a reactor having at least one inlet for receiving a gas flow and at least one inlet for receiving solid particles. The apparatus also includes a separation volume containing at least a portion of the reactor. At least one separator is contained within the separation volume for separating a flow into a product flow portion and one or more additional flow portions, the product flow portion having a lower density than the one or more additional flow portions. The at least one separator is in fluid communication with the reactor and is configured to receive a gas-solids flow from the reactor. The apparatus also includes one or more primary external separators, located outside of the disengaging vessel, for separating a flow into a first flow portion and a second flow portion. During operation of the one or more primary external separators, the first flow portion includes at least 0.5% of the gas and has a higher density than the second flow portion. The one or more primary external separators are configured to receive the product flow portion from the at least one separator contained in the separation volume as an input flow. The apparatus also includes a secondary external separator for separating a flow into a third flow portion and a fourth flow portion, with the third flow portion having a higher density than the fourth flow portion. The secondary external separator is configured to receive the first flow portion from the one or more primary external separators as an input flow. Additionally, the apparatus includes a retaining volume for capturing solids contained in the third flow portion from the secondary external separator and for transferring captured solids to the reaction system.

BRIEF DESCRIPTION OF THE DRAWINGS

Various embodiments of the invention are also described in the accompanying drawings, wherein.

DETAILED DESCRIPTION OF THE INVENTION

I. Overview

This invention provides a method and apparatus for separating solids from a gas flow in a gas-solids reaction system. In particular, the process and apparatus of the invention provide improved solid particle recovery from a gas containing hydrocarbons via a novel configuration and method for operating sequential cyclone separator stages. This is accomplished in part by a method and apparatus that make use of a reaction system having two or more stages of separators that are external to the reactor. The external separator stages are used to recover additional catalyst for return to the reaction system, such as by returning the catalyst to the reactor or regenerator, while minimizing or preventing any loss of the desired hydrocarbon reaction product.

Figure 2:
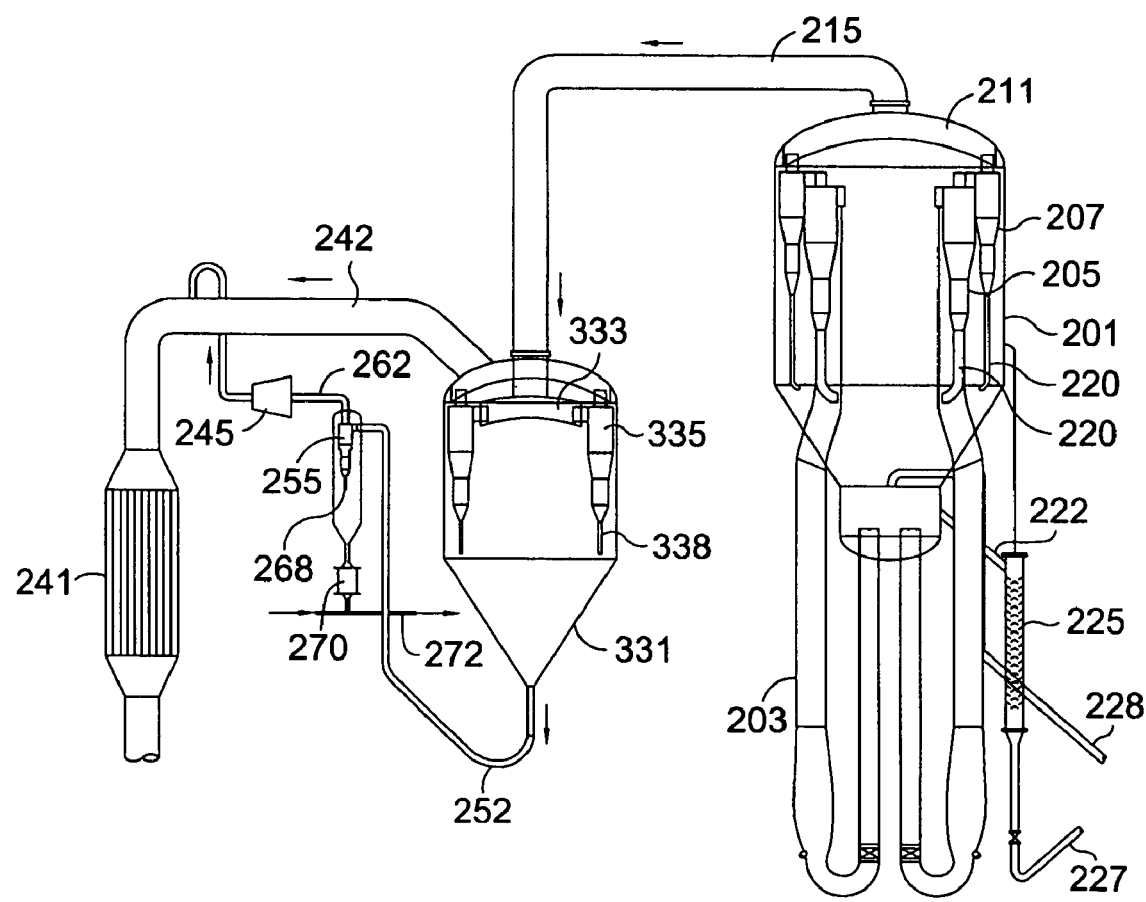
FIG. 2 depicts a schematic of a reactor including a multi-stage cyclone separator according to an embodiment of the invention.

In an embodiment, the invention provides a gas-solids reactor with a multistage cyclone separator having 4 cyclone separator stages. The third and fourth cyclone separator stages are located in one or more disengaging vessels that are external to the reactor and at a slightly lower pressure. The 4th stage can be a stage located either internal in another vessel as shown in FIG. 2 or it can be external to the vessel and discharge the solids into the vessel. During operation of the gas-solids reactor, a reaction is performed such as an oxygenate to olefin conversion reaction. In such a reaction, an oxygenate feedstock is contacted with particles of a solid catalyst while flowing through the reactor. The hydrocarbon and other gas phase products of the reaction are then recovered by separating the catalyst solids from the reacted feedstock.

The first two stages of the multi-stage separator can be cyclones or other conventional separation devices located within the oxygenate to olefin reactor. These first two separation stages will remove the majority of catalyst from the reacted feedstock flow. After passing through the initial two separation stages, however, the reacted feedstock flow will still have some catalyst entrained in the gas flow. This entrained catalyst can include a high proportion of fines, or particles with a diameter below 44 microns. The fines are useful for improving the fluidization properties of particles in a fluidized bed. To remove the particles (including fines) remaining in the reacted feedstock flow, the flow is passed into a plurality of third stage cyclones or other separators. The third stage cyclones are operated in an underflow condition in order to remove as many of the solid particles as possible from the main reacted feedstock flow while minimizing the likelihood that the cyclones will become plugged or jammed. The underflow from the third stage cyclones, now more concentrated in solids particles than the third stage inlet by a factor of 30 or more, is then fed into the input of a fourth stage cyclone to remove the remaining reacted feedstock from the solid particles. The reacted feedstock separated out by the fourth stage cyclone is added back to the main reacted feedstock flow, while the fines and other solid particles are returned to the reactor or regenerator for further use.

In an alternative embodiment, the multistage separator can have 3 or more separator stages. In such an embodiment, at least the final two separator stages are located external to the reactor, such as in an external disengaging vessel. Additionally, at least two of the external separator stages are configured so that the underflow of one stage of separators is used as the input for a subsequent separator stage.

II. Operation of a Cyclone Separator

During operation a cyclone separator stage receives at least one input flow via one or more input conduits. The one or more cyclones in the cyclone separator stage each produce a lower density (gas) flow that conventionally exits from an output conduit near the top of the separator stage. The one or more cyclones in the cyclone separator stage also produce a higher density (solids) flow that exits through the dipleg of each separator or another high density output conduit. Note that the lower density flow exiting a cyclone will often be a gas-solids flow, as some solid particles will typically remain in the lower density flow exiting a cyclone.

When a cyclone separator is operated without having a gas underflow, the cyclone separator is operated to maintain at least a minimum solid particle flux (or mass flux) in the output flow exiting through the dipleg of the separator. For the cyclone to operate properly, the flow through the dipleg should be enough to "seal" the dipleg and prevent gas flow back up through the dipleg into the cyclone. In other words, enough catalyst should exit the dipleg to prevent gas from flowing up from the catalyst bed (or other location that receives the separated catalyst particles), through the dipleg, and back into the barrel of the cyclone due to pressure differential. However, the diameter and length of the dipleg must also be large enough so that catalyst can exit the dipleg without clogging or jamming. Otherwise, the solid particles can build up a catalyst level in the dipleg that reaches back into the cyclone barrel. In an embodiment, the solid particle flux through the dipleg of a cyclone is at least 25 lb/ft$^2$*sec (1.0 kg/m$^2$*sec), or at least 50 lb/ft$^2$*sec (2.1 kg/m$^2$*sec), or at least 75 lb/ft$^2$*sec (3.2 kg/m$^2$*sec). In another embodiment, the solid particle flux through the dipleg of the cyclone is 150 lb/ft$^2$*sec (6.4 kg/m$^2$*sec) or less.

The solid particle flux exiting through the dipleg of the cyclone is influenced by the size of the dipleg. If the same total mass flow is passed through two diplegs, the dipleg having the larger diameter will have a correspondingly lower flow velocity through the dipleg. Thus, if the amount of catalyst that will be exiting a cyclone is known, the dipleg diameter can be selected so that a preferred dipleg output solid particle flux is achieved. However, if the selected dipleg size is too small, the dipleg may be prone to catalyst bridging or jamming. As a result, diplegs with a diameter of at least 2" (5 cm) are preferred, diplegs with a diameter of at least 4" (10 cm) are more preferred, and diplegs with a diameter of at least 6" (15 cm) are even more preferred.

Alternatively, a cyclone separator can be operated to have an underflow of gas exiting via the dipleg with the catalyst. By allowing a portion of the reaction product gas to exit with the catalyst as an underflow, efficient separation of the solids can be achieved even in a low catalyst loading situation. For example, if the loading in a cyclone will not be sufficient for proper operation of a cyclone with a 2" (5 cm) or larger dipleg, operating the cyclone with an underflow of gas will allow a 2" (5 cm) or larger dipleg to be used while minimizing the chance of backflow into the cyclone. Note that operating a cyclone separator to have an underflow requires maintaining a pressure within the cyclone that is higher than the pressure external to the cyclone. The higher internal pressure allows gas to flow from the cyclone interior, through the dipleg, and out into the external environment of the cyclone. If the external pressure is greater than the pressure inside the cyclone, gas will tend to flow from the external environment into the cyclone, leading to a backflow condition.

Figure 1:
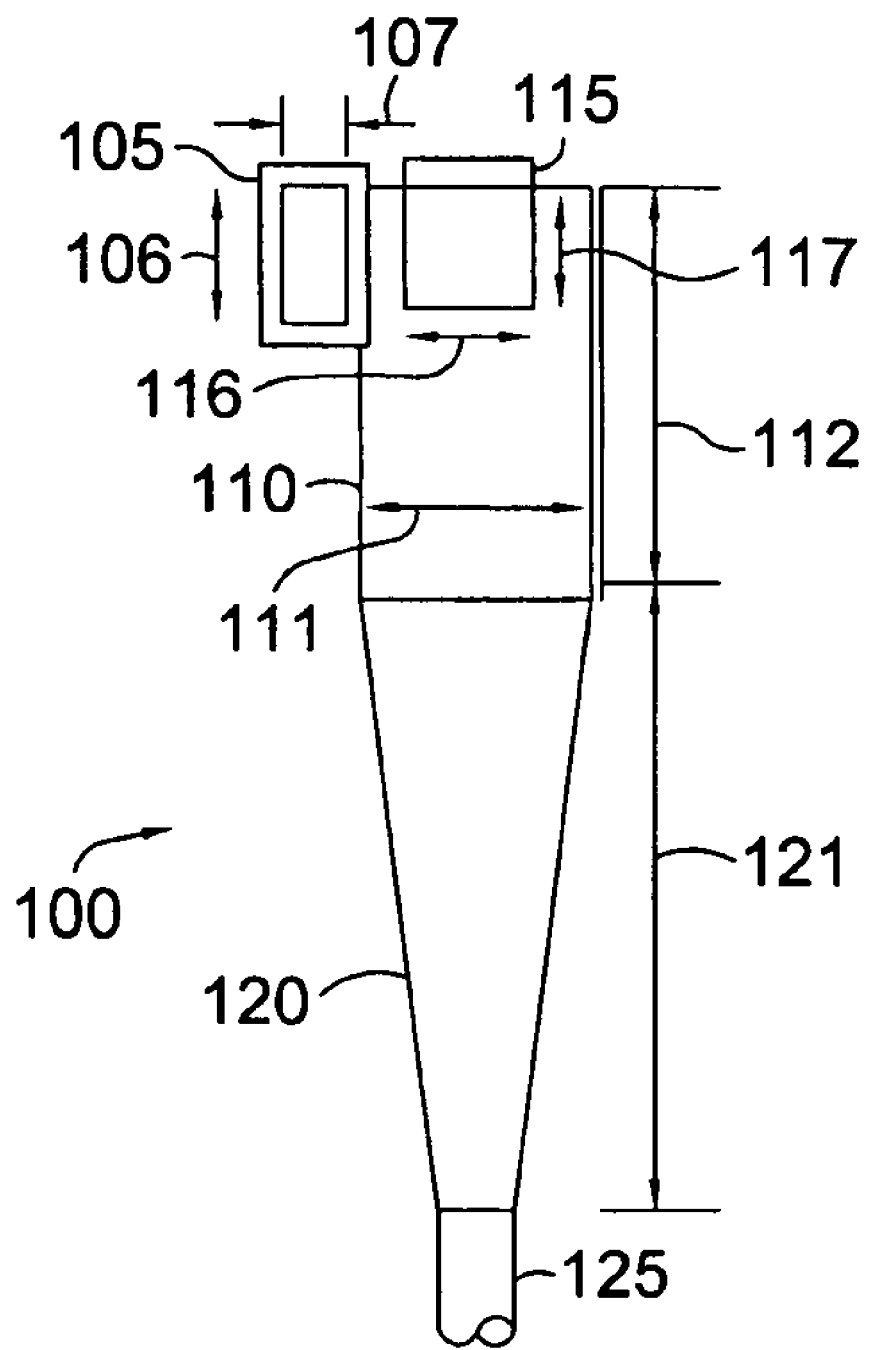
FIG. 1 depicts a simplified schematic of a cyclone separator according to an embodiment of the invention.

FIG. 1 schematically depicts an individual cyclone separator stage suitable for use in an embodiment of the invention. The cyclone 100 schematically shown in FIG. 1 includes a cyclone inlet 105, a cyclone barrel 110, an outlet pipe 115, and a cyclone cone 120 leading to a dipleg 125.

In an embodiment, the cyclone barrel 110 can have a diameter 111 of from about 1 foot (0.3 m) to about 9 feet (2.7 m). In various embodiments, the diameter of the cyclone barrel can be 2 feet (0.6 m) or greater, or 3 feet (0.9 m) or greater, or 4 feet (1.2 m) or greater, or 6 feet (1.8 m) or greater, or 8 feet (2.4 m) or greater. In corresponding embodiments, the diameter of the cyclone barrel can be 3 feet (0.9 m) or less, or 4 feet (1.2 m) or less, or 6 feet (1.8 m) or less, or 8 feet (2.4 m) or less, or 9 feet (2.7 m) or less.

The height 112 of cyclone barrel 110 can be from about 3 feet (0.9 m) to about 30 feet (9.1 m). In various embodiments, the height of the cyclone barrel can be 3 feet (0.9 m) or greater, or 5 feet (1.5 m) or greater, or 10 feet (3.0 m) or greater, or 15 feet (4.6 m) or greater, or 20 feet (6.1 m) or greater. Alternatively, the height of the cyclone barrel can be 10 feet (3.0) or less, or 15 feet (4.6 m) or less, or 20 feet (6.1 m) or less, or 25 feet (7.6 m) or less, or 30 feet(9.1 m) or less.

The height 106 of cyclone inlet 105 can be from about 2 feet (0.6 m) to about 6 feet (1.8 m). In various embodiments, the height of the cyclone inlet can be 2 feet (0.6 m) or greater, or 3 feet (0.9 m) or greater, or 4 feet (1.2 m) or greater, or 5 feet (1.5 m) or greater. Alternatively, the height of the cyclone inlet can be 3 feet (0.9 m) or less, or 4 feet (1.2 m) or less, or 5 feet (1.5 m) or less, or 6 feet (1.8 m) or less.

The width 107 of cyclone inlet 105 can be the same as the height 106 to produce a symmetric (square or circular) inlet, or the width can be from about 1 foot (0.3 m) to about 4 feet (1.2 m). In various embodiments, the width of the cyclone inlet can be 1 foot (0.3 m) or greater, 2 feet (0.6 m) or greater, or 3 feet (0.9 m) or greater. Alternatively the width of the cyclone inlet can be 2 feet (0.6 m) or less, or 3 feet (0.9 m) or less, or 4 feet (1.2 m) or less.

The diameter 116 of outlet pipe 115 can be from about 1 foot (0.3 m) to about 6 feet (1.8 m). In various embodiments, the diameter of the outlet pipe can be 1 foot (0.3 m) or greater, 1.5 feet (0.5 m) or greater, 2 feet (0.6 m) or greater, 3 feet (0.9 m) or greater, 4 feet (1.2 m) or greater, or 5 feet (1.5 m) or greater. Alternatively, the diameter of the outlet pipe can be 1.5 feet (0.5 m) or less, 2 feet (0.6 m) or less, 3 feet (0.9 m) or less, 4 feet (1.2 m) or less, 5 feet (1.5 m) or less, or 6 feet (1.8 m) or less.

The length 117 that outlet pipe 115 extends into barrel 110 can be from about 2 feet (0.6 m) to about 5 feet (1.5 m). In various embodiments, the length that the outlet pipe extends into the barrel can be 2 feet (0.6 m) or greater, 3 feet (0.9 m) or greater, or 4 feet (1.2 m) or greater. Alternatively, the length that the outlet pipe extends into the barrel can be 3 feet (0.9 m) or less, 4 feet (1.2 m) or less, or 5 feet (1.5 m) or less.

The height 121 of cyclone cone 120 can be from about 5 feet (1.5 m) to about 50 feet (15.2 m). In various embodiments, the height of the cyclone cone can be 5 feet (1.5 m) or greater, 10 feet (3.0 m) or greater, 20 feet (6.1 m) or greater, or 30 feet (9.1 m) or greater. Alternatively, the height of the cyclone cone can be 15 feet (4.6 m) or less, 25 feet (7.6 m) or less, 35 feet (10.6 m) or less, or 50 (15.2 m) feet or less.

The diameter of dipleg 125 can be from about 0.15 feet (0.05 m) to about 5 feet (1.5 m). In various embodiments, the diameter of the dipleg can be 0.15 feet (0.5 m) or greater, or 0.33 feet (0.1 m) or greater, or 0.5 feet (0.15 m) or greater, or 1 foot (0.3 m) or greater, or 1.5 feet (0.5 m) or greater, or 2 feet (0.6 m) or greater, or 2.5 feet (0.8 m) or greater, or 3 feet (0.9 m) or greater, or 3.5 feet (1.1 m) or greater, or 4 feet (1.2 m) or greater. Alternatively, the diameter can be 1 foot (0.3 m) or less, or 1.5 feet (0.5 m) or less, or 2 feet (0.6 m) or less, or 2.5 feet (0.8 m) or less, or 3 feet (0.9 m) or less, or 3.5 feet (1.1 m) or less, or 4 feet (1.2 m) or less, or 4.5 feet (1.4 m) or less, or 5 feet (1.5 m) or less.

III. External Separator Stages

A. Cyclone Operation

The efficiency of a cyclone separator for removing solid particles in a gas-solids flow is believed to depend on the size of the particles. One model for describing the particle removal efficiency of a properly operating cyclone separator is the Lapple Grade Efficiency Curve. Models for cyclone efficiency such as the Lapple Grade Efficiency Curve typically show a dependence on the size of particle being removed, with smaller particles being removed less efficiently. To improve the separation efficiency of solid particles from a gas-solids flow, a separation device can be formed using multiple cyclones in series that are arranged in stages.

When multiple cyclones are arranged in stages, the lower density flow of one stage is conventionally directed into the input of a following or subsequent cyclone stage. The coupling between consecutive cyclone stages can be any conventional type of open or close coupling. The higher density flows of each cyclone stage are conventionally directed to a suitable location for receiving solids separated from the initial gas-solids flow. For example, in a fluidized bed reactor, the particles contained in the higher density flow can be routed back into the fluidized bed.

As a gas-solids flow passes through a multi-stage cyclone separator, each stage will remove a portion of the solids from the flow. As a result, in an embodiment where the gas solids flow has passed through at least two stages, the lower density flow may only have an output flow rate of catalyst particles of 50 lb/hr (23 kg/hr), or 75 lb/hr (34 kg/hr), or 100 lb/hr (45 kg/hr). In a conventional cyclone design, a cyclone separator receiving a flow rate of less than 100 lb/hr (45 kg/hr) would require a dipleg of a ½" (1.2 cm) or less in diameter base on conventional solids flux criteria. Unfortunately, diplegs of this size are prone to jamming or catalyst bridging.

In an embodiment of the invention, the problem of having a separator stage of cyclones with small diplegs can be avoided by allowing a second or later stage of cyclones to operate with a gas underflow. Preferably, a third or later stage of cyclones is operated with a gas underflow. The underflow output of the separators being operated in the underflow condition is then used as the input for an additional, preferably final separator stage. By operating with an underflow, a dipleg large enough to avoid jamming or catalyst bridging can be used even with a low level of catalyst loading. The underflow also prevents any backflow from rising up through the diplegs into the barrel of the cyclones. Additionally, the concentration of particulate solids in the underflow is increased above that in the stage inlet by an order of magnitude or more, allowing for more efficient separation in the additional or final stage.

In order to operate one or more separators, such as cyclone separators, with a gas underflow, the pressure of the external environment of the separators needs to be able to be controlled independently of the reactor pressure. To allow this, a separator stage having one or more separators can be located in an external disengaging vessel or other separation volume outside of the reactor. In an embodiment where a third stage of cyclones will be operated in an underflow condition, the lower density output flow from all second stage separators can be combined in a single flow and flowed into an external disengaging vessel. This output flow from the second stage separators becomes the input flow for the third stage separators.

In such an embodiment, the input flow into the one or more third stage cyclones (or other separators) is then separated into a lower density and a higher density output flow. The lower density output flow is composed primarily of the reacted feedstock flow. This lower density output flow is ready for further processing, such as passing the feedstock through a quench tower to reduce the temperature of the flow. Because the third stage cyclones are being operated in an underflow condition, the higher density output flow is composed of solids as well as a portion of the reacted feedstock gas. In an embodiment, a cyclone can be operated with an underflow of gas that is at least 0.5% of the total gas flow entering the cyclone, or at least 1%, or at least 1.5%, or at least 2%, or at least 2.5%. In another embodiment, a cyclone can be operated with an underflow of 5% or less of the total gas flow entering the cyclone, or 4% or less, or 3.5% or less, or 3% or less.

The higher density output contains the majority of the solids found in the third stage input flow but only a few percent of the gas. As a result, the higher density output flows of the third stage cyclones have a higher catalyst loading than the third stage input flows. These third stage higher density output flows can be combined and used as the input flow for one or more fourth stage cyclones. The higher catalyst loading in the input to the one or more fourth stage cyclones allows the fourth stage cyclones to be operated in a conventional manner and not in an underflow condition. The fourth stage separator or separators are used to separate the catalyst solids from the underflow portion of the reacted feedstock gas. The lower density output of the fourth stage separators corresponds to the reacted feedstock gas, while the higher density portion is the catalyst solids.

In an embodiment, the underflow condition for the third stage cyclones is created by reducing the pressure of the external environment to create a pressure drop from the cyclone interior to the external environment. In such an embodiment, the cyclone operating in the underflow condition is preferably located in a separate vessel from the reactor, such as an external disengaging vessel. This allows the pressure of the external environment of the cyclone to be reduced without changing the operating conditions for the conversion reaction.

In an exemplary embodiment the inlet pressure for the third stage cyclones can be 20 psig (138 kPa) or greater, or 22.5 psig (155 kPa) or greater, or 25 psig (173 kPa) or greater, or 27.5 psig (190 kPa) or greater, or 30 psig (208 kPa) or greater. The pressure drop within the third stage cyclones can be 0.5 psig (3.4 kPa) or greater, or 1.0 psig (6.9 kPa) or greater, or 1.5 psig (10.3 kPa) or greater. Alternatively, the outlet pressures for the third stage cyclones can be 18 psig (124 kPa) or greater, or 20 psig (138 kPa) or greater, or 22.5 psig (173 kPa) or greater, or 25 psig (173 kPa) or greater, or 27.5 psig (190 kPa) or greater. The collected underflow from the third stage cyclones is then flowed into the inlet of the fourth stage cyclones. To achieve an underflow condition, the pressure in the disengaging vessel housing the third stage cyclones is maintained at a pressure below the outlet pressure of the high density output for the third stage cyclone. In an embodiment, the pressure in the disengaging vessel housing the third stage cyclones is 17.5 psig (121 kPa) or less, or 19.5 psig (134 kPa) or less, or 22 psig (152 kPa) or less, or 24.5 psig (169 kPa) or less, or 27 psig (186 kPa) or less. After entering the fourth stage cyclones, a further pressure drop occurs, leading to outlet pressures for the fourth stage cyclone of 15 psig (103 kPa) or greater, or 17.5 psig (121 kPa) or greater, or 20 psig (138 kPa) or greater, or 22.5 psig (173 kPa) or greater, or 25 psig (173 kPa) or greater.

In embodiments where the invention is used to separate reacted feedstock gas or other hydrocarbon gases from solid catalyst entrained in a gas flow, the temperature of the gas flow in the third and fourth stage separators should also be maintained at a sufficient temperature to avoid condensation or mud formation within the separators. In an oxygenate to olefin reaction, the reacted feedstock flow will have a "dew point" of about 250° F. (121° C.). This "dew point" refers to the temperature at which portions of the reacted feedstock flow will begin to condense and form a liquid phase. To prevent condensation of any portion of the reacted feedstock flow, the temperature of the feedstock flow can be maintained at a sufficiently high temperature. In an embodiment, the temperature of a gas or gas-solids flow passing through a third and/or fourth stage cyclone is maintained to be at least 250° F., or at least 275° F. (135° C.), or at least 300° F. (149° C.), or at least 325° F. (163° C.), or at least 350° F. (177° C.). In another embodiment, the temperature of a gas or gas-solids flow passing through a third and/or fourth stage cyclone is maintained at 425° F. (218° C.) or less, or 400° F. (204° C.) or less, or 375° F. (191° C.) or less, or 350° F. (177° C.) or less.

In a preferred embodiment, the temperature of the gas-solids flows in the third and fourth stage reactors is also maintained at a temperature sufficient to minimize or prevent hydrothermal deactivation of the catalyst. Some types of molecular sieve catalyst, such as SAPO catalysts, are susceptible to deactivation if exposed to water at lower temperatures. This deactivation can be avoided at higher temperatures. In an embodiment, the temperature of a gas or gas-solids flow in a third and/or fourth stage cyclone is maintained to be at least 550° F. (288° C.), or at least 600° F. (316° C.), or at least 650° F. (343° C.), or at least 700° F. (371° C.). In another embodiment, the temperature of a gas or gas-solids flow in a third and/or fourth stage cyclone is maintained to be 750° F. (399° C.) or less, or 700° F. (371° C.) or less, or 650° F. (343° C.) or less.

B. Additional Processing of External Separator Stage Output Flows

The third and fourth stage separators (or any other stages operated so that the dipleg/underflow output of one stage is used as the input to the other stage) produce three output flows that can undergo further processing: a lower density output flow from the third stage separators, a lower density output flow from the fourth stage separator, and a higher density output flow from the fourth stage separator. The lower density output flow from the third stage separators corresponds to a main reacted feedstock flow, which contains the majority of the reacted feedstock flow produced in the reactor. The lower density output from the fourth stage separator is also a portion of the reacted feedstock flow, and this flow is preferably added into the main portion of the reacted feedstock flow in order to maximize the recovery of reaction products from the conversion reaction. Because the input flow for the fourth stage separators corresponds to the underflow from the third stage separators, the lower density output of the fourth stage separator can be referred to as the underflow portion of the reacted feedstock flow.

The underflow portion of the reacted feedstock can be added back into the main portion of the reacted feedstock flow at any convenient location. For example, the underflow portion can be added to the main portion of the feedstock flow prior to passing the reacted feedstock flow through a quench system or another type of downstream processing apparatus. In order to add the underflow portion of the feedstock to the main flow prior to downstream processing, the pressure of the underflow portion is matched to the pressure of the main flow. As indicated above, the pressure in the vessel containing the third stage cyclones can be reduced in order to set up the underflow condition. This loss of pressure must be accounted for in order to add the underflow portion of the reacted feedstock flow back into the main portion. The pressure of the underflow portion of the feedstock flow can be increased using a blower, compressor, or any other convenient means of increasing the pressure of a gas. Alternatively, the underflow portion of the feedstock flow can be added back into the main portion farther downstream at location where the pressure of the underflow portion matches the pressure of the main portion, such as after quenching of the main portion of the feedstock flow.

Alternatively, the underflow portion of the reacted feedstock can be added to the main reacted feedstock flow after the main flow passes through a quench system. The quench system will cool the main portion of the reacted feedstock flow Cooling the main portion of the reacted feedstock flow will also lead to a reduced pressure for the flow. If the pressure of the main flow is reduced enough, the underflow portion of the reacted feedstock will not need to be pressurized prior to addition to the main flow. The underflow portion may have a higher temperature than the quenched main flow, but the amount of gas in the underflow portion is small relative to the main flow, so adding the underflow portion of the reacted feedstock to the main portion should cause only a small temperature increase.

The separated catalyst produced by the fourth stage separator (higher density output) is captured and added into the catalyst in the reaction system, such as in the reactor or regenerator. In an embodiment, the separated catalyst is captured in at retaining volume such as a lock hopper. A lock hopper refers to a volume that can be selectively pressurized and opened to allow flows to enter and leave the volume. During operation, the lock hopper receives any catalyst exiting the fourth stage separator as part of the higher density flow. After the lock hopper has accumulated an amount of catalyst, the lock hopper can be sealed off from the fourth stage separator, such as by closing a valve. The lock hopper is then pressurized to set up a flow to return the accumulated catalyst to the reactor or regenerator. After returning the accumulated catalyst to the reactor or regenerator, the lock hopper is depressurized and once again allowed to receive the higher density output flow of the fourth separator stage. The pressure in the lock hopper can be modified using $N_2$, steam, or another gas compatible with the processing conditions in an oxygenate to olefin reaction system. Similarly, $N_2$, steam, or another compatible gas can be used to set up a flow of the accumulated solids back into the reactor or regenerator. The accumulated solids can also be subjected to a stripping process to remove adsorbed hydrocarbons prior to returning the solids to the reactor or regenerator.

In an alternative embodiment, non-conventional cyclones can also be used in this invention. Such cyclones include cyclonic separators having a variety of geometries, such as various conical or cylindrical geometries that are susceptible to use in creating a cyclone for separation by density. Such separators preferably cause separation by a mechanism similar to a centrifuge. A flow is introduced into the cyclone with sufficient velocity to set up a swirling flow pattern in the separator. As the flow travels through the cyclone separator, higher density components of the flow, such as solid particles, are driven to the barrel wall of the cyclone and are believed to flow under the influence of gravity and centrifugal force until the particles exit out the bottom. The lower density components, such as the gas phase components of a gas-solids flow, tend to be driven to the center of the barrel and exit through an outlet tube out the top of the device under the influence of a pressure field. In still another embodiment, other types of separators useful for gas-solids separation may also be configured and used according to the invention, so long as the separators can be operated in an external disengaging vessel and in an underflow condition.

IV. Operation of a Multi-Stage Cyclone Within a Reaction System

FIG. 2 schematically depicts an example of a reaction system according to an embodiment of the invention. The reaction system includes a riser reactor having a multi-stage separator that includes third stage and fourth stage cyclones in an external disengaging vessel. In FIG. 2, a vessel 201 surrounds the upper terminal end of a plurality of risers 203 which are each attached a primary cyclone 205 and a secondary cyclone 207. The primary cyclones 205 are attached to the risers 203 by means of an enclosed conduit. The primary cyclone 205 in turn is closely coupled to the secondary cyclone 207. Overhead gas from the secondary cyclone 207 exits the vessel 201 by means of an overhead plenum 211. The gases and entrained solids which exit the reactor through the overhead plenum 211 flow into connecting conduit 215. Catalyst recovered by the cyclones 205 and 207 drops through cyclone diplegs 220 into a catalyst bed in the lower portion of vessel 201. The catalyst can be drawn out of vessel 201 via conduit 222 into catalyst stripper 225. After passing through stripper 225, catalyst can then flow to a regeneration system (not shown) via conduit 227. After regeneration, catalyst is returned to the vessel 201 via conduit 228.

Figure 3:
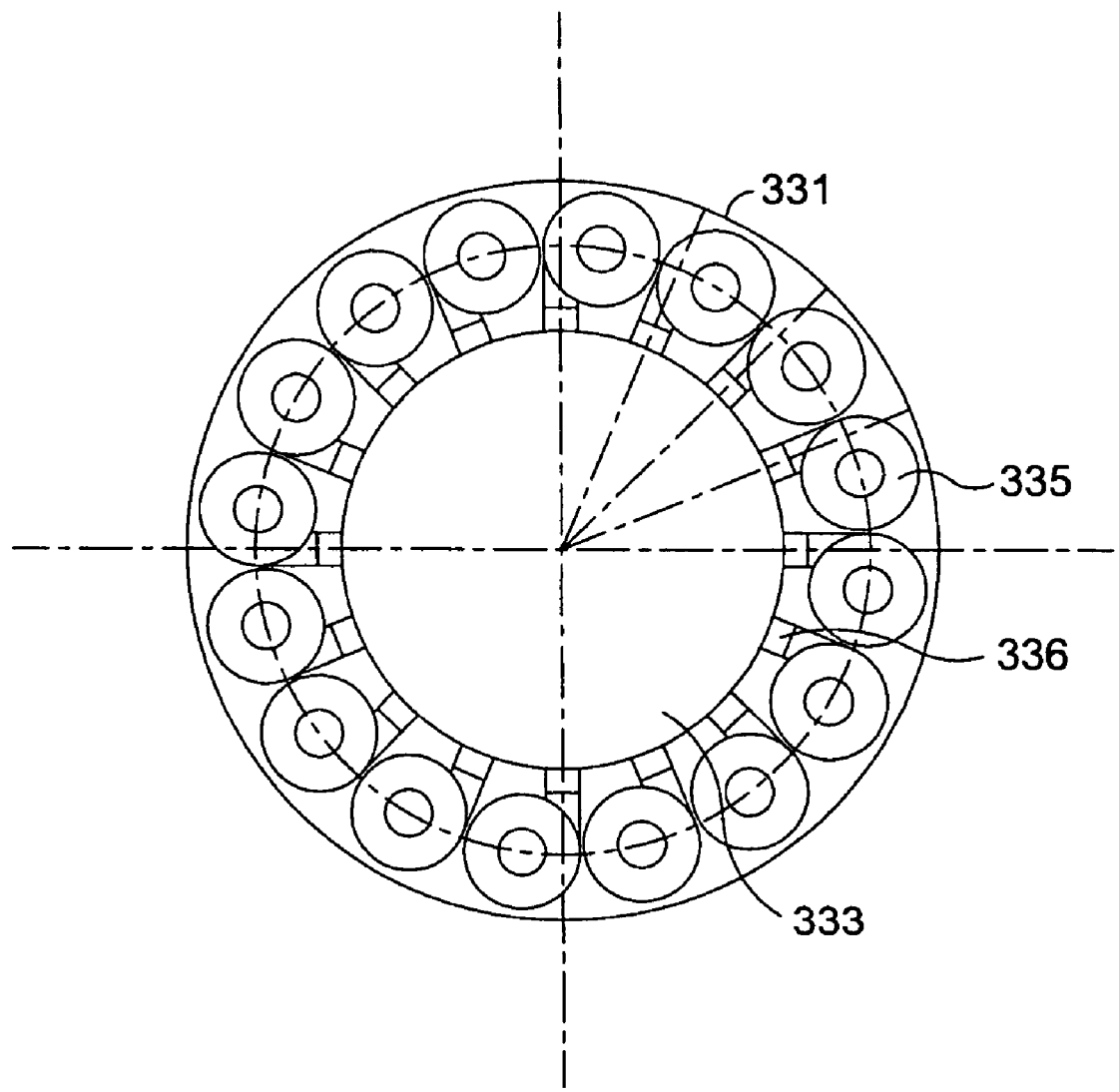
FIG. 3 depicts a simplified schematic of a cross section of a third stage separator vessel including cyclones according to an embodiment of the invention.

The gases and entrained solids which enter connecting conduit 215 flow into the third stage external disengaging vessel 331. FIG. 3 provides a top view of the third stage external disengaging vessel 331. The gases and entrained solids initially enter plenum 333, and then flow into the third stage cyclones 335 via cyclone inlets 336. As shown in FIG. 2, overhead gas from third stage cyclones 335 exits via conduit 242 and is flowed toward quench tower 241. The underflow from third stage cyclones 335 exits via diplegs 338. The underflow flows through conduit 252 and enters fourth stage cyclone 255. The lower density gas portion of the flow exits fourth stage cyclone 255 via conduit 262 to rejoin the main portion of the flow in conduit 242. Prior to joining conduit 242, the pressure of the flow in conduit 262 is increased using blower 245. The higher density solids portion exits fourth stage cyclone 255 via dipleg 268 and accumulates in lock hopper 270. The catalyst accumulated in lock hopper 270 can be periodically returned to vessel 201 or a regenerator (not shown) by flowing the catalyst through conduit 272.

V. Types of Reaction Systems

The separation devices and separation processes of this invention are useful in any reaction system for performing reactions involving solid particles entrained in a gas-solids flow. Non-limiting examples of such reaction systems include reaction systems selected from the group consisting of catalytic cracking reaction systems, transalkylation reaction systems, isomerization reaction systems, catalytic dewaxing systems, alkylation reaction systems, hydrocracking reaction systems, systems for converting paraffins to olefins, systems for converting paraffins to aromatics, systems for converting olefins to gasoline, systems for converting olefins to distillate, systems for converting olefins to lubes, systems for converting alcohols to olefins, disproportionation reaction systems, systems for converting aromatics to higher aromatics, systems for adsorbing aromatics, systems for converting oxygenates (e.g., alcohols) to olefins, systems for converting oxygenates (e.g., alcohols) to aromatics or gasoline, systems for oligomerizing olefins, and systems for converting unsaturated hydrocarbons to aldehydes. More specifically, such examples include:

A) The catalytic cracking of a naphtha feed to produce light olefins. Typical reaction conditions include from about 500° C. to about 750° C., pressures of subatmospheric or atmospheric, generally ranging up to about 10 atmospheres (gauge) and residence time (time of contact of feed and/or product with catalyst) from about 10 milliseconds to about 10 seconds;

B) The catalytic cracking of high molecular weight hydrocarbons to lower weight hydrocarbons. Typical reaction conditions for catalytic cracking include temperatures of from about 400° C. to about 700° C., pressures of from about 0.1 atmosphere (bar) to about 30 atmospheres, and weight hourly space velocities of from about 0.1 $hr^{-1}$ to about 100 $hr^{-1}$;

C) The transalkylation of aromatic hydrocarbons in the presence of polyalkylaromatic hydrocarbons. Typical reaction conditions include a temperature of from about 200° C. to about 500° C., a pressure of from about atmospheric to about 200 atmospheres, a weight hourly space velocity of from about 1 $hr^{-1}$ to about 100 $hr^{-1}$, and an aromatic hydrocarbon/polyalkylaromatic hydrocarbon mole ratio of from about 1/1 to about 16/1;

D) The isomerization of aromatic (e.g., xylene) feedstock components. Typical reaction conditions for such include a temperature of from about 230° C. to about 510° C., a pressure of from about 0.5 atmospheres to about 50 atmospheres, a weight hourly space velocity of from about 0.1 $hr^{-1}$ to about 200 $hr^{-1}$, and a hydrogen/hydrocarbon mole ratio of from about 0 to about 100/1;

E) The catalytic dewaxing of hydrocarbons by selectively removing straight chain paraffins. The reaction conditions are dependent in large measure on the feed used and upon the desired pour point. Typical reaction conditions include a temperature between about 200° C. and 450° C., a pressure of up to 3,000 psig and a liquid hourly space velocity from 0.1 $hr^{-1}$ to 20 $hr^{-1}$.

F) The alkylation of aromatic hydrocarbons, e.g., benzene and alkylbenzenes, in the presence of an alkylating agent, e.g., olefins, formaldehyde, alkyl halides and alcohols having 1 to about 20 carbon atoms. Typical reaction conditions include a temperature of from about 100° C. to about 500° C., a pressure of from about atmospheric to about 200 atmospheres, a weight hourly space velocity of from about 1 $hr^{-1}$ to about 100 $hr^{-1}$, and an aromatic hydrocarbon/alkylating agent mole ratio of from about 1/1 to about 20/1;

G) The alkylation of aromatic hydrocarbons, e.g., benzene, with long chain olefins, e.g., $C_{14}$ olefin. Typical reaction conditions include a temperature of from about 50° C. to about 200° C., a pressure of from about atmospheric to about 200 atmospheres, a weight hourly space velocity of from about 2 $hr^{-1}$ to about 2000 $hr^{-1}$, and an aromatic hydrocarbon/olefin mole ratio of from about 1/1 to about 20/1. The resulting products from the reaction are long chain alkyl aromatics, which when subsequently sulfonated have particular application as synthetic detergents;

H) The alkylation of aromatic hydrocarbons with light olefins to provide short chain alkyl aromatic compounds, e.g., the alkylation of benzene with propylene to provide cumene. Typical reaction conditions include a temperature of from about 10° C. to about 200° C., a pressure of from about 1 to about 30 atmospheres, and an aromatic hydrocarbon weight hourly space velocity (WHSV) of from 1 $hr^{-1}$ to about 50 $hr^{-1}$;

I) The hydrocracking of heavy petroleum feedstocks, cyclic stocks, and other hydrocrack charge stocks. The catalyst will contain an effective amount of at least one hydrogenation component;

J) The alkylation of a reformate containing substantial quantities of benzene and toluene with fuel gas containing short chain olefins (e.g., ethylene and propylene) to produce mono- and dialkylates. Preferred reaction conditions include temperatures from about 100° C. to about 250° C., a pressure of from about 100 psig to about 800 psig, a WHSV-olefin from about 0.4 $hr^{-1}$ to about 0.8 $hr^{-1}$, a WHSV-reformate of from about 1 $hr^{-1}$ to about 2 $hr^{-1}$ and, optionally, a gas recycle from about 1.5 to about 2.5 vol/vol fuel gas feed;

K) The alkylation of aromatic hydrocarbons, e.g., benzene, toluene, xylene, and naphthalene, with long chain olefins, e.g., $C_{14}$ olefin, to produce alkylated aromatic lube base stocks. Typical reaction conditions include temperatures from about 100° C. to about 400° C. and pressures from about 50 psig to 450 psig;

L) The alkylation of phenols with olefins or equivalent alcohols to provide long chain alkyl phenols. Typical reaction conditions include temperatures from about 100° C. to about 250° C., pressures from about 1 to 300 psig and total WHSV of from about 2 $hr^{-1}$ to about 10 $hr^{-1}$;

M) The conversion of light paraffins to olefins and/or aromatics. Typical reaction conditions include temperatures from about 425° C. to about 760° C. and pressures from about 10 psig to about 2000 psig;

N) The conversion of light olefins to gasoline, distillate and lube range hydrocarbons. Typical reaction conditions include temperatures of from about 175° C. to about 375° C., and a pressure of from about 100 psig to about 2000 psig;

O) Two-stage hydrocracking for upgrading hydrocarbon streams having initial boiling points above about 200° C. to premium distillate and gasoline boiling range products or as feed to further fuels or chemicals processing steps. Either stage of the two-stage system can contain catalyst, which contains molecular sieve that is susceptible to loss of catalytic activity due to contact with water molecules. Typical reaction conditions include temperatures of from about 315° C. to about 455° C., pressures of from about 400 to about 2500 psig, hydrogen circulation of from about 1000 SCF/bbl to about 10,000 SCF/bbl and a liquid hourly space velocity (LHSV) of from about 0.1 $hr^{-1}$ to 10 $hr^{-1}$;

P) A combination hydrocracking/dewaxing process in the presence of a catalyst that contains molecular sieve that is susceptible to loss of catalytic activity due to contact with water molecules. The catalyst generally further comprises a hydrogenation component. Optionally included in the catalyst is zeolite molecular sieve such as zeolite Beta. Typical reaction conditions include temperatures from about 350° C. to about 400° C., pressures from about 1400 psig to about 1500 psig, LHSVs from about 0.4 $hr^{-1}$ to about 0.6 $hr^{-1}$ and a hydrogen circulation from about 3000 to about 5000 SCF/bbl;

Q) The reaction of alcohols with olefins to provide mixed ethers, e.g., the reaction of methanol with isobutene and/or isopentene to provide methyl-t-butyl ether (MTBE) and/or t-amyl methyl ether (TAME). Typical conversion conditions include temperatures from about 20° C. to about 200° C., pressures from 2 to about 200 atm, WHSV (gram-olefin per hour gram-zeolite) from about 0.1 $hr^{-1}$ to about 200 $hr^{-1}$ and an alcohol to olefin molar feed ratio from about 0.1/1 to about 5/1;

R) The disproportionation of aromatics, e.g., the disproportionation toluene to make benzene and paraxylene. Typical reaction conditions include a temperature of from about 200° C. to about 760° C., a pressure of from about atmospheric to about 60 atmosphere (bar), and a WHSV of from about 0.1 $hr^{-1}$ to about 30 $hr^{-1}$;

S) The conversion of naphtha (e.g., $C_6$-$C_{10}$) and similar mixtures to highly aromatic mixtures. Thus, normal and slightly branched chained hydrocarbons, preferably having a boiling range above about 40° C., and less than about 200° C., can be converted to products having a substantially higher octane aromatics content by contacting the hydrocarbon feed with a molecular sieve catalyst at a temperature of from about 400° C. to 600° C., preferably from about 480° C. to about 550° C., at pressures of from atmospheric to 40 bar, and liquid hourly space velocities (LHSV) of from about 0.1 $hr^{-1}$ to 15 $hr^{-1}$;

T) The adsorption of alkyl aromatic compounds for the purpose of separating various isomers of the compounds;

U) The conversion of oxygenates, e.g., alcohols, such as methanol, or ethers, such as dimethylether, or mixtures thereof to hydrocarbons including olefins and aromatics with reaction conditions including temperatures of from about 275° C. to about 600° C., pressures of from about 0.5 atmosphere to about 50 atmospheres, and a liquid hourly space velocity of from about 0.1 $hr^{-1}$ to about 100 $hr^{-1}$;

V) The oligomerization of straight and branched chain olefins having from about 2 to about 5 carbon atoms. The oligomers which are the products of the process are medium to heavy olefins which are useful for both fuels, i.e., gasoline or a gasoline blending stock, and chemicals. The oligomerization process is generally carried out by contacting the olefin feedstock in a gaseous state phase with a molecular sieve catalyst at a temperature in the range of from about 250° C. to about 800° C., a LHSV of from about 0.2 $hr^{-1}$ to about 50 $hr^{-1}$, and a hydrocarbon partial pressure of from about 0.1 to about 50 atmospheres. Temperatures below about 250° C. may be used to oligomerize the feedstock when the feedstock is in the liquid phase when contacting the coated zeolite catalyst. Thus, when the olefin feedstock contacts the catalyst in the liquid phase, temperatures of from about 10° C. to about 250° C. may be used;

W) The conversion of $C_2$ unsaturated hydrocarbons (ethylene and/or acetylene) to aliphatic $C_{6-12}$ aldehydes and converting said aldehydes to the corresponding $C_{6-12}$ alcohols, acids, or esters.

In general, reactor conditions include a temperature of from about 100° C. to about 760° C., a pressure of from about 0.1 atmosphere (bar) to about 200 atmospheres (bar), a weight hourly space velocity of from about 0.08 $hr^{-1}$ to about 2,000 $hr^{-1}$.

The separation processes of this invention are particularly suited to large, commercial scale reaction systems. For example, the separation processes of this invention are particularly suited to reaction systems that require a catalyst loading of at least about 1,000 kg of catalyst, based on total amount of catalyst located throughout the reaction system. In particular, the separation processes of this invention are particularly suited to reaction systems that require a catalyst loading of at least about 10,000 kg of catalyst, more particularly a catalyst loading of at least about 100,000 kg of catalyst, and most particularly a catalyst loading of at least about 250,000 kg of catalyst, based on total amount of catalyst located throughout the reaction system.

VI. Oxygenate to Olefin Reactions

An example of a reaction system that benefits from this invention is an oxygenate-to-olefin process. Conventionally, oxygenate-to-olefin processes are carried out in a fluidized bed, fast fluidized bed, or riser reactor configuration where a fluid (gas) flow of a feedstock is passed through a bed of solid catalyst particles. More generally, the processes of this invention are applicable to gas-solids reaction systems where the solids are separated from the gas flow at some point during the reaction process, including systems where the gas is inert. The examples below describe an oxygenate to olefin reaction system that can be improved using the separation process of the invention.

Oxygenates used in this invention include one or more organic compound(s) containing at least one oxygen atom. In the most preferred embodiment of the process of invention, the oxygenate in the feedstock is one or more alcohol(s), preferably aliphatic alcohol(s) where the aliphatic moiety of the alcohol(s) has from 1 to 20 carbon atoms, preferably from 1 to 10 carbon atoms, and most preferably from 1 to 4 carbon atoms. The alcohols useful as feedstock in the process of the invention include lower straight and branched chain aliphatic alcohols and their unsaturated counterparts. Non-limiting examples of oxygenates include methanol, ethanol, n-propanol, isopropanol, methyl ethyl ether, dimethyl ether, diethyl ether, di-isopropyl ether, formaldehyde, dimethyl carbonate, dimethyl ketone, acetic acid, and mixtures thereof. In the most preferred embodiment, the feedstock is selected from one or more of methanol, ethanol, dimethyl ether, diethyl ether or a combination thereof, more preferably methanol and dimethyl ether, and most preferably methanol.

The feedstock, in one embodiment, contains one or more diluent(s), typically used to reduce the concentration of the feedstock, and are generally non-reactive to the feedstock or molecular sieve catalyst composition. Non-limiting examples of diluents include helium, argon, nitrogen, carbon monoxide, carbon dioxide, water, essentially non-reactive paraffins (especially alkanes such as methane, ethane, and propane), essentially non-reactive aromatic compounds, and mixtures thereof. The most preferred diluents are water and nitrogen, with water being particularly preferred.

The diluent is either added directly to a feedstock entering into a reactor or added directly to a reactor, or added with a molecular sieve catalyst composition. In one embodiment, the amount of diluent in the feedstock is in the range of from about 1 to about 99 mole percent based on the total number of moles of the feedstock and diluent, preferably from about 1 to 80 mole percent, more preferably from about 5 to about 50, most preferably from about 5 to about 25. In another embodiment, other hydrocarbons are added to a feedstock either directly or indirectly, and include olefin(s), paraffin(s), aromatic(s), or mixtures thereof, preferably propylene, butylene, pentylene, and other hydrocarbons having 4 or more carbon atoms, or mixtures thereof.

In a conventional oxygenate to olefin reaction, a feed containing an oxygenate is contacted in a reaction zone of a reactor apparatus with a molecular sieve catalyst at process conditions effective to produce light olefins, i.e., an effective temperature, pressure, WHSV (weight hour space velocity) and, optionally, an effective amount of diluent, correlated to produce light olefins. Usually, the oxygenate feed is contacted with the catalyst when the oxygenate is in a vapor phase. Alternately, the process may be carried out in a liquid or a mixed vapor/liquid phase. When the process is carried out in a liquid phase or a mixed vapor/liquid phase, different conversions and selectivities of feed-to-product may result depending upon the catalyst and reaction conditions. As used herein, the term reactor includes not only commercial scale reactors but also pilot sized reactor units and lab bench scale reactor units.

The conversion of oxygenates to produce light olefins may be carried out in a variety of large scale catalytic reactors, including, but not limited to, fluid bed reactors and concurrent riser reactors as described in *Fluidization Engineering*, D. Kunii and O. Levenspiel, Robert E. Krieger Publishing Co. NY, 1977. Additionally, countercurrent free fall reactors may be used in the conversion process. See, for example, U.S. Pat. No. 4,068,136 and *Fluidization and Fluid-Particle Systems*, pages 48-59, F. A. Zenz and D. F. Othmer, Reinhold Publishing Corp., NY 1960.

In one embodiment of this invention, the gas and solid particles are flowed through the gas-solids reactor system at a weight hourly space velocity (WHSV) of from about 1 $hr^{-1}$ to about 5,000 $hr^{-1}$, preferably from about 5 $hr^{-1}$ to about 3,000 $hr^{-1}$, more preferably from about 10 $hr^{-1}$ to about 1,500 $hr^{-1}$, and most preferably from about 20 $hr^{-1}$ to about 1,000 $hr^{-1}$. In one preferred embodiment, the WHSV is greater than 25 $hr^{-1}$, and up to about 500 $hr^{-1}$. In this invention, WHSV is defined as the total weight per hour of the gas flowing between reactor walls divided by the total weight of the solids flowing between the same segment of reactor walls. The WHSV is maintained at a level sufficient to keep the catalyst composition in a fluidized state within a reactor.

In another embodiment of the invention directed toward use of cyclones in conjunction with a riser reactor, the gas and solid particles are flowed through the gas-solids reactor system at a gas superficial velocity (GSV) at least 1 meter per second (m/sec), preferably greater than 2 m/sec, more preferably greater than 3 m/sec, and most preferably greater than 4 m/sec. The GSV should be sufficient to maintaining the solids in a fluidized state, particularly in a fast fluidized state.

In still another embodiment, cyclones configured according to this invention can be used with a fixed fluidized bed reactor. In such an embodiment, the GSV can be as low as 0.03 m/s.

In yet another embodiment of the invention, the solids particles and gas are flowed through the gas-solids reactor at a solids to gas mass ratio of about 5:1 to about 75:1. Preferably, the solids particles and gas are flowed through the gas-solids reactor at a solids to gas mass ratio of about 8:1 to about 50:1, more preferably from about 10:1 to about 40:1.

In one practical embodiment, the process is conducted as a fluidized bed process or high velocity fluidized bed process utilizing a reactor system, a regeneration system and a recovery system. In such a process the reactor system conveniently includes a fluid bed reactor system having a first reaction region consisting of various fast fluid or dense fluid beds in series or parallel and a second reaction region within at least one disengaging vessel, comprising two or more cyclones configured and/or operated according to various embodiments of the invention. In one embodiment, the fast fluid or dense fluid beds and disengaging vessel are contained within a single reactor vessel. Fresh feedstock, preferably containing one or more oxygenates, optionally with one or more diluent(s), is fed to the one or more fast fluid or dense fluid beds reactor(s) into which a molecular sieve catalyst composition or coked version thereof is introduced. In one embodiment, prior to being introduced to the reactor(s), the molecular sieve catalyst composition or coked version thereof is contacted with a liquid and/or vapor, preferably water and methanol, and a gas, for example, an inert gas such as nitrogen.

In an embodiment, the amount of fresh feedstock fed as a liquid and/or a vapor to the reactor system is in the range of from 0.1 weight percent to about 99.9 weight percent, such as from about 1 weight percent to about 99 weight percent, more typically from about 5 weight percent to about 95 weight percent based on the total weight of the feedstock including any diluent contained therein. The liquid and vapor feedstocks may be the same composition, or may contain varying proportions of the same or different feedstocks with the same or different diluents.

The process of this invention can be conducted over a wide range of temperatures, such as in the range of from about 200° C. to about 1000° C., for example from about 250° C. to about 800° C., including from about 250° C. to about 750° C., conveniently from about 300° C. to about 650° C., typically from about 350° C. to about 600° C. and particularly from about 350° C. to about 550° C.

Similarly, the process of this invention can be conducted over a wide range of pressures including autogenous pressure. Typically the partial pressure of the feedstock exclusive of any diluent therein employed in the process is in the range of from about 0.1 kPaa to about 5 MPaa, such as from about 5 kPaa to about 1 MPaa, and conveniently from about 20 kPaa to about 500 kPaa.

In embodiments involving a riser reactor, the solids particles and gas are flowed through the gas-solids reactor at a solids to gas mass ratio of about 0.5:1 to about 75:1. Preferably, the solids particles and gas are flowed through the gas-solids reactor at a solids to gas mass ratio of about 8:1 to about 50:1, more preferably from about 10:1 to about 40:1.

During the conversion of a hydrocarbon feedstock, preferably a feedstock containing one or more oxygenates, the amount of olefin(s) produced based on the total weight of hydrocarbon produced is greater than 50 weight percent, typically greater than 60 weight percent, such as greater than 70 weight percent, and preferably greater than 75 weight percent. In one embodiment, the amount of ethylene and/or propylene produced based on the total weight of hydrocarbon product produced is greater than 65 weight percent, such as greater than 70 weight percent, for example greater than 75 weight percent, and preferably greater than 78 weight percent. Typically, the amount ethylene produced in weight percent based on the total weight of hydrocarbon product produced, is greater than 30 weight percent, such as greater than 35 weight percent, for example greater than 40 weight percent. In addition, the amount of propylene produced in weight percent based on the total weight of hydrocarbon product produced is greater than 20 weight percent, such as greater than 25 weight percent, for example greater than 30 weight percent, and preferably greater than 35 weight percent.

The feedstock entering the reactor system is preferably converted, partially or fully, in a reaction region into a gaseous effluent. This gaseous effluent enters a disengaging vessel along with the coked catalyst composition. In an embodiment, the disengaging vessel includes cyclone separators configured and/or operated according to the invention. In another embodiment, the disengaging vessel also includes a stripping zone, typically in a lower portion of the disengaging vessel. In the stripping zone the coked catalyst composition is contacted with a gas, preferably one or a combination of steam, methane, carbon dioxide, carbon monoxide, hydrogen, or an inert gas such as argon, preferably steam, to recover adsorbed hydrocarbons from the coked catalyst composition. In still another preferred embodiment, the reacted feedstock flow enters a series of disengaging vessels which each house one or more cyclones and/or cyclone stages. This series of disengaging vessels allows the external pressure of some or all of the cyclone stages to be controlled independently of the reactor pressure. Each of the series of disengaging vessels can optionally include a stripping zone for recover adsorbed hydrocarbons. After passing exiting the one or more disengaging vessels, some or all of the catalyst in each disengaging vessel can then introduced to a regeneration system.

In an embodiment, at least a portion of the coked catalyst composition is withdrawn from one or more of the disengaging vessels and introduced to the regeneration system. The regeneration system comprises a regenerator where the coked catalyst composition is contacted with a regeneration medium, preferably a gas containing oxygen, under conventional regeneration conditions of temperature, pressure and residence time. In an embodiment, a gas-solids flow exiting a regenerator may be passed through cyclones configured according to the invention. Alternatively, at least a portion of the catalyst can be flowed to bypass the regeneration system. The catalyst bypassing the regenerator can be flowed to another desired portion of the reaction system, such as flowing the catalyst directly into a catalyst cooler or allowing the catalyst to rejoin a fluidized bed in the reactor.

Non-limiting examples of suitable regeneration media include one or more of oxygen, $O_3$, $SO_3$, $N_2O$, NO, $NO_2$, $N_2O_5$, air, air diluted with nitrogen or carbon dioxide, oxygen and water, carbon monoxide and/or hydrogen. Suitable regeneration conditions are those capable of burning coke from the coked catalyst composition, preferably to a level less than 0.5 weight percent based on the total weight of the coked molecular sieve catalyst composition entering the regeneration system. For example, the regeneration temperature may be in the range of from about 200° C. to about 1500° C., such as from about 300° C. to about 1000° C., for example from about 450° C. to about 750° C., and conveniently from about 550° C. to about 700° C. The regeneration pressure may be in the range of from about 15 psia (103 kPaa) to about 500 psia (3448 kPaa), such as from about 20 psia (138 kPaa) to about 250 psia (1724 kPaa), including from about 25 psia (172 kPaa) to about 150 psia (1034 kPaa), and conveniently from about 30 psia (207 kPaa) to about 60 psia (414 kPaa).

The residence time of the catalyst composition in the regenerator may be in the range of from about one minute to several hours, such as from about one minute to 100 minutes. The amount of oxygen in the regeneration flue gas (i.e., gas which leaves the regenerator) may be in the range of from about 0.01 mole percent to about 5 mole percent based on the total volume of the gas. The amount of oxygen in the gas used to regenerate the coked catalyst (i.e., fresh or feed gas) is typically at least about 15 mole percent, preferably at least about 20 mole percent, and more preferably from about 20 mole percent to about 30 mole percent, based on total amount of regeneration gas fed to the regenerator.

The burning of coke in the regeneration step is an exothermic reaction, and in an embodiment, the temperature within the regeneration system is controlled by various techniques in the art including feeding a cooled gas to the regenerator vessel, operated either in a batch, continuous, or semi-continuous mode, or a combination thereof. A preferred technique involves withdrawing the regenerated catalyst composition from the regeneration system and passing it through a catalyst cooler to form a cooled regenerated catalyst composition. The catalyst cooler, in an embodiment, is a heat exchanger that is located either internal or external to the regeneration system.

The regenerated catalyst composition withdrawn from the regeneration system, preferably from the catalyst cooler, is combined with a fresh molecular sieve catalyst composition and/or re-circulated molecular sieve catalyst composition and/or feedstock and/or fresh gas or liquids, and returned to the reactor(s). In one embodiment, the regenerated catalyst composition withdrawn from the regeneration system is returned to the reactor(s) directly, preferably after passing through a catalyst cooler. A carrier, such as an inert gas, feedstock vapor, steam or the like, may be used, semi-continuously or continuously, to facilitate the introduction of the regenerated catalyst composition to the reactor system, preferably to the one or more reactor(s).

By controlling the flow of the regenerated catalyst composition or cooled regenerated catalyst composition from the regeneration system to the reactor system, the optimum level of coke on the molecular sieve catalyst composition entering the reactor is maintained. There are many techniques for controlling the flow of a catalyst composition described in Michael Louge, *Experimental Techniques, Circulating Fluidized Beds*, Grace, Avidan and Knowlton, eds., Blackie, 1997 (336-337).

Coke levels on the catalyst composition are measured by withdrawing the catalyst composition from the conversion process and determining its carbon content. Typical levels of coke on the molecular sieve catalyst composition, after regeneration, are in the range of from 0.01 weight percent to about 15 weight percent, such as from about 0.1 weight percent to about 10 weight percent, for example from about 0.2 weight percent to about 5 weight percent, and conveniently from about 0.3 weight percent to about 2 weight percent based on the weight of the molecular sieve.

The gaseous reactor effluent is withdrawn from the disengaging system and is passed through a recovery system. There are many well known recovery systems, techniques and sequences that are useful in separating olefin(s) and purifying olefin(s) from the gaseous effluent. Recovery systems generally comprise one or more or a combination of various separation, fractionation and/or distillation towers, columns, splitters, or trains, reaction systems such as ethylbenzene manufacture and other derivative processes such as aldehydes, ketones and ester manufacture, and other associated equipment, for example various condensers, heat exchangers, refrigeration systems or chill trains, compressors, knock-out drums or pots, pumps, and the like.

Non-limiting examples of these towers, columns, splitters or trains used alone or in combination include one or more of a demethanizer, preferably a high temperature demethanizer, a dethanizer, a depropanizer, a wash tower often referred to as a caustic wash tower and/or quench tower, absorbers, adsorbers, membranes, ethylene ($C_2$) splitter, propylene ($C_3$) splitter and butene ($C_4$) splitter.

Generally accompanying most recovery systems is the production, generation or accumulation of additional products, by-products and/or contaminants along with the preferred prime products. The preferred prime products, the light olefins, such as ethylene and propylene, are typically purified for use in derivative manufacturing processes such as polymerization processes. Therefore, in the most preferred embodiment of the recovery system, the recovery system also includes a purification system. For example, the light olefin(s) produced particularly in a MTO process are passed through a purification system that removes low levels of by-products or contaminants.

Typically, in converting one or more oxygenates to olefin(s) having 2 or 3 carbon atoms, a minor amount hydrocarbons, particularly olefin(s), having 4 or more carbon atoms is also produced. The amount of $C_4$+ hydrocarbons is normally less than 20 weight percent, such as less than 10 weight percent, for example less than 5 weight percent, and particularly less than 2 weight percent, based on the total weight of the effluent gas withdrawn from the process, excluding water. Typically, therefore the recovery system may include one or more reaction systems for converting the $C_4$+ impurities to useful products.

VII. Description of Solid Particles

In an embodiment, the apparatus and method of the invention are generally useful for separating any solid particles in a gas-solids flow. In another embodiment, the solid particles can be catalyst particles, such as molecular sieve catalyst particles.

Molecular sieve catalyst particles for use in a gas-solids reaction can be synthesized by a variety of methods. In an embodiment, catalyst particles are synthesized by combining a first dried molecular sieve catalyst with water to make a water-catalyst composition, making a slurry from the water-catalyst composition, and drying the slurry to produce a second dried molecular sieve catalyst. The method particularly provides for the re-manufacturing, recycling or re-working of dried or substantially dried, or partially dried molecular sieve catalysts to yield catalyst particles with properties that are acceptable to the user or manufacturer. Such properties are usually observed after the dried molecular sieve catalyst is calcined. These properties include acceptable particle size, particle size distribution, particle density, and particle hardness.

The catalysts of this invention can include any of a variety of molecular sieve components. The components include zeolites or non-zeolites, preferably non-zeolites. In one embodiment, the molecular sieves are small pore non-zeolite molecular sieves having an average pore size of less than about 5 angstroms, preferably an average pore size ranging from about 3 to 5 angstroms, more preferably from 3.5 to 4.2 angstroms. These pore sizes are typical of molecular sieves having 8 membered rings.

Conventional crystalline aluminosilicate zeolites having catalytic activity are desirable molecular sieves that can be used in making the catalyst of this invention. Examples of such zeolite materials are described in U.S. Pat. Nos. 3,660,274 and 3,944,482, both of which are incorporated herein by reference. Non-limiting examples of zeolites which can be employed in the practice of this invention, include both natural and synthetic zeolites. These zeolites include zeolites of the structural types included in the *Atlas of Zeolite Framework Types*, edited by Ch. Baerlocher, W. M. Meier, D. H. Olson, Fifth Revised edition, Elsevier, Amsterdam, 2001.

Zeolites typically have silica-to-alumina ($SiO_2/Al_2O_3$) mole ratios of at least about 2, and have uniform pore diameters from about 3 to 15 Angstroms. They also generally contain alkali metal cations, such as sodium and/or potassium and/or alkaline earth metal cations, such as magnesium and/or calcium. In order to increase the catalytic activity of the zeolite, it may be desirable to decrease the alkali metal content of the crystalline zeolite to less than about 5 wt. %, preferably less than about 1 wt. %, and more preferably less than about 0.5 wt. %. The alkali metal content reduction, as is known in the art, may be conducted by exchange with one or more cations selected from the Groups IIB through VIII of the Periodic Table of Elements (the Periodic Table of Elements referred to herein is given in *Handbook of Chemistry and Physics*, published by the Chemical Rubber Publishing Company, Cleveland, Ohio, 45th Edition, 1964 or 73rd Edition, 1992), as well as with hydronium ions or basic adducts of hydronium ions, e.g., $NH_4^+$, capable of conversion to a hydrogen cation upon calcination. Desired cations include rare earth cations, calcium, magnesium, hydrogen and mixtures thereof.

In another embodiment, the catalyst particles which are flowed through the gas-solids reactor system of this invention are molecular sieve catalysts, such as a conventional molecular sieve. Examples include zeolite as well as non-zeolite molecular sieves, and are of the large, medium or small pore type. Non-limiting examples of these molecular sieves are the small pore molecular sieves, AEI, AFT, APC, ATN, ATT, ATV, AWW, BIK, CAS, CHA, CHI, DAC, DDR, EDI, ERI, GOO, KFI, LEV, LOV, LTA, MON, PAU, PHI, RHO, ROG, THO, and substituted forms thereof; the medium pore molecular sieves, AFO, AEL, EUO, HEU, FER, MEL, MFI, MTW, MTT, TON, and substituted forms thereof; and the large pore molecular sieves, EMT, FAU, and substituted forms thereof. Other molecular sieves include ANA, BEA, CFI, CLO, DON, GIS, LTL, MER, MOR, MWW and SOD. Non-limiting examples of the preferred molecular sieves, particularly for converting an oxygenate containing feedstock into olefin(s), include AEL, AFY, BEA, CHA, EDI, FAU, FER, GIS, LTA, LTL, MER, MFI, MOR, MTT, MWW, TAM and TON. In one preferred embodiment, the molecular sieve of the invention has an AEI topology or a CHA topology, or a combination thereof, most preferably a CHA topology.

Molecular sieve materials all have 3-dimensional, four-connected framework structure of corner-sharing $TO_4$ tetrahedra, where T is any tetrahedrally coordinated cation. These molecular sieves are typically described in terms of the size of the ring that defines a pore, where the size is based on the number of T atoms in the ring. Other framework-type characteristics include the arrangement of rings that form a cage, and when present, the dimension of channels, and the spaces between the cages. See van Bekkum, et al., *Introduction to Zeolite Science and Practice*, Second Completely Revised and Expanded Edition, Volume 137, pages 1-67, Elsevier Science, B. V., Amsterdam, Netherlands (2001).

Other molecular sieves include those described in EP-0 888 187 B1 (microporous crystalline metallophosphates, $SAPO_4$ (UIO-6)), U.S. Pat. No. 6,004,898 (molecular sieve and an alkaline earth metal), U.S. Pat. No. 6,743,747 (integrated hydrocarbon co-catalyst), PCT WO 01/64340 published Sep. 7, 2001 (thorium containing molecular sieve), and R. Szostak, *Handbook of Molecular Sieves*, Van Nostrand Reinhold, New York, N.Y. (1992).

The more preferred silicon, aluminum and/or phosphorous containing molecular sieves, and aluminum, phosphorous, and optionally silicon, containing molecular sieves include aluminophosphate (ALPO) molecular sieves and silicoaluminophosphate (SAPO) molecular sieves and substituted, preferably metal substituted, ALPO and SAPO molecular sieves. The most preferred molecular sieves are SAPO molecular sieves, and metal substituted SAPO molecular sieves. In an embodiment, the metal is an alkali metal of Group IA of the Periodic Table of Elements, an alkaline earth metal of Group IIA of the Periodic Table of Elements, a rare earth metal of Group IIIB, including the Lanthanides: lanthanum, cerium, praseodymium, neodymium, samarium, europium, gadolinium, terbium, dysprosium, holmium, erbium, thulium, ytterbium and lutetium; and scandium or yttrium of the Periodic Table of Elements, a transition metal of Groups IVB, VB, VIB, VIIB, VIIIB, and IB of the Periodic Table of Elements, or mixtures of any of these metal species. In one preferred embodiment, the metal is selected from the group consisting of Co, Cr, Cu, Fe, Ga, Ge, Mg, Mn, Ni, Sn, Ti, Zn and Zr, and mixtures thereof. In another preferred embodiment, these metal atoms discussed above are inserted into the framework of a molecular sieve through a tetrahedral unit, such as $[MeO_2]$, and carry a net charge depending on the valence state of the metal substituent. For example, in one embodiment, when the metal substituent has a valence state of +2, +3, +4, +5, or +6, the net charge of the tetrahedral unit is between −2 and +2.

In one embodiment, the molecular sieve, as described in many of the U.S. Patents mentioned above, is represented by the empirical formula, on an anhydrous basis:

$$mR:(M_xAl_yP_z)O_2$$

wherein R represents at least one templating agent, preferably an organic templating agent; m is the number of moles of R per mole of $(M_xAl_yP_z)O_2$ and m has a value from 0 to 1, preferably 0 to 0.5, and most preferably from 0 to 0.3; x, y, and z represent the mole fraction of Al, P and M as tetrahedral oxides, where M is a metal selected from one of Group IA, IIA, IB, IIIB, IVB, VB, VIB, VIIB, VIIIB and Lanthanide's of the Periodic Table of Elements, preferably M is selected from one of the group consisting of Co, Cr, Cu, Fe, Ga, Ge, Mg, Mn, Ni, Sn, Ti, Zn and Zr. In an embodiment, m is greater than or equal to 0.2, and x, y and z are greater than or equal to 0.01.

In another embodiment, m is greater than 0.1 to about 1, x is greater than 0 to about 0.25, y is in the range of from 0.4 to 0.5, and z is in the range of from 0.25 to 0.5, more preferably m is from 0.15 to 0.7, x is from 0.01 to 0.2, y is from 0.4 to 0.5, and z is from 0.3 to 0.5.

Non-limiting examples of SAPO molecular sieves useful herein include SAPO-5, SAPO-8, SAPO-11, SAPO-16, SAPO-17, SAPO-18, SAPO-20, SAPO-31, SAPO-34, SAPO-35, SAPO-36, SAPO-37, SAPO-40, SAPO-41, SAPO-42, SAPO-44, SAPO-47, SAPO-56 and metal containing molecular sieves thereof. Of these, particularly useful molecular sieves are SAPO-18, SAPO-34, SAPO-35, SAPO-44, SAPO-56 and metal containing derivatives thereof. SAPO-34 is particularly preferred.

In another embodiment of the invention, the catalyst used in this invention incorporates aluminophosphate (AlPO) molecular sieves. These molecular sieves can be included as separate crystals or they can be intermixed with other crystalline structures such as by an intergrowth structure. Examples of aluminophosphates include AlPO-5, AlPO-11, AlPO-18, AlPO-31, AlPO-34, AlPO-36, AlPO-37 and AlPO-46.

In one embodiment, the catalyst includes a combination of at least one SAPO and at least one AlPO molecular sieve, wherein the SAPO is selected from the group consisting of SAPO-5, SAPO-8, SAPO-11, SAPO-16, SAPO-17, SAPO-18, SAPO-20, SAPO-31, SAPO-34, SAPO-35, SAPO-36, SAPO-37, SAPO-40, SAPO-41, SAPO-42, SAPO-44, SAPO-47 and SAPO-56, and the AlPO is selected from the group consisting of AlPO-5, AlPO-11, AlPO-18, AlPO-31, AlPO-34, AlPO-36, AlPO-37 and AlPO-46. The sieves can be combined as separate crystals or as intergrown crystals. Preferably, the SAPO is SAPO-18 or SAPO-34, and preferably, the AlPO is AlPO-34 or AlPO-18.

Note that SAPO-18, AlPO-18 and RUW-18 have an AEI framework-type, and SAPO-34 has a CHA framework-type, and that preferred molecular sieves used herein may comprise at least one intergrowth phase of AEI and CHA framework-types, especially where the ratio of CHA framework-type to AEI framework-type, as determined by the DIFFaX method disclosed in U.S. Patent Application Publication No. 2002-0165089, is greater than 1:1.

The molecular sieves are made or formulated into catalysts by combining the synthesized molecular sieves with a binder and/or a matrix material to form a molecular sieve catalyst composition or a formulated molecular sieve catalyst composition. This formulated molecular sieve catalyst composition is formed into useful shape and sized particles by conventional techniques such as spray drying, pelletizing, extrusion, and the like.

One skilled in the art will also appreciate that the olefins produced by the oxygenate-to-olefin conversion reaction of the present invention can be polymerized to form polyolefins, particularly polyethylene and polypropylene. Processes for forming polyolefins from olefins are known in the art. Catalytic processes are desired. Particularly desired are metallocene, Ziegler/Natta and acid catalytic systems. In general, these methods involve contacting the olefin product with a polyolefin-forming catalyst at a pressure and temperature effective to form the polyolefin product.

Persons of ordinary skill in the art will recognize that many modifications may be made to the present invention without departing from the spirit and scope of the present invention. The embodiments described herein are meant to be illustrative only and should not be taken as limiting the invention, which is defined by the following claims.

We claim:

1. A method for separating solids from a gas-solids flow, comprising:
   a) flowing a gas-solids flow comprising a hydrocarbon gas from a reactor into a separation volume, the separation volume being external to the reactor;
   b) separating the gas-solids flow into a first flow portion and a second flow portion, the first flow portion comprising at least 0.5% of the gas in the gas-solids flow and having a higher density than the second flow portion;
   c) separating the first flow portion into a third flow portion and fourth flow portion, the third flow portion having a higher density than the fourth flow portion;
   d) maintaining the temperature of the first flow portion, second flow portion, and fourth flow portion at 250° F. or greater;
   e) merging the fourth flow portion with the second flow portion;
   f) capturing the solids of the third flow portion in a retaining volume; and
   g) transferring the captured solids from the retaining volume to the reactor.

2. The method of claim 1, wherein transferring the captured solids from the retaining volume to the reactor comprises regenerating at least a portion of the captured solids prior to returning the portion of the captured solids to the reactor.

3. The method of claim 1, wherein the external separation volume is a disengaging vessel.

4. The method of claim 1, separating the first flow portion into a third flow portion and fourth flow portion further comprises flowing the first flow portion into a second separation volume external to the reactor.

5. The method of claim 1, wherein the retaining volume is a lock hopper.

6. The method of claim 1, wherein the temperature of the first flow portion, second flow portion, and fourth flow portion are maintained at 300° F. or greater.

7. The method of claim 1, wherein the temperature of the first flow portion, second flow portion, and fourth flow portion are maintained at 550° F. or greater.

8. The method of claim 1, wherein the temperature of the first flow portion, second flow portion, and fourth flow portion are maintained at 600° F. or greater.

9. The method of claim 1, wherein the first flow portion comprises at least 2% of the gas in the gas solids flow.

10. The method of claim 1, further comprising stripping the solids of the third flow portion.

11. The method of claim 10, wherein the solids of the third flow portion are stripped prior to capturing the solids in the retaining volume.

12. The method of claim 1, further comprising increasing the pressure of the fourth flow portion prior to merging the fourth flow portion with the second flow portion.

13. The method of claim 12, wherein increasing the pressure of the fourth flow portion comprises passing the fourth flow portion through a blower.

14. The method of claim 1, wherein transferring the captured solids comprises:
   sealing the retaining volume to prevent additional accumulation of solids from the third flow portion in the retaining volume;
   flowing the captured solids into the reactor.

15. The method of claim 14, wherein the captured solids are flowed into the reactor using a flow of $N_2$ or steam.

16. The method of claim 1, wherein transferring the captured solids comprises:
   sealing the retaining volume to prevent additional accumulation of solids from the
   third flow portion in the retaining volume;
   regenerating at least a portion of the captured solids;
   flowing the captured solids into the reactor.

17. The method of claim 1, further comprising quenching the merged second flow portion and fourth flow portion.

18. The method of claim 1, wherein the solids in the gas-solids flow comprise a SAPO molecular sieve.

19. The method of claim 1, wherein the gas-solids flow from the reactor comprises the lower density output of one or more second stage separation devices.

20. An apparatus for separating solids from a gas flow, comprising:
   a) a reactor having at least one inlet for receiving a gas flow and at least one inlet for receiving solid particles;
   b) a separation volume containing at least a portion of the reactor;
   c) at least one separator, contained within the separation volume, for separating a flow into a product flow portion and one or more additional flow portions, the product flow portion having a lower density than the one or more additional flow portions, the at least one separator being in fluid communication with the reactor and configured to receive a gas-solids flow from the reactor;
   d) one or more primary external separators, located outside of the separation volume, for separating a flow into a first flow portion and a second flow portion, the first flow portion comprising at least 0.5% of the gas having a higher density than the second flow portion, the one or more primary external separators being configured to receive the product flow portion from the at least one separator contained in the separation volume as an input flow;
   e) a secondary external separator for separating a flow into a third flow portion and a fourth flow portion, the third flow portion having a higher density than the fourth flow portion, the secondary external separator being configured to receive the first flow portion from the one or more primary external separators as an input flow; and
   f) a retaining volume for capturing solids contained in the third flow portion from the secondary external separator and for transferring captured solids to the reactor, wherein the secondary external separator is configured to merge the fourth flow portion with the second flow portion either prior to or after quenching of the second flow portion.

21. The apparatus of claim 20, wherein the retaining volume comprises a lock hopper.

22. The apparatus of claim 20, further comprising a quench system for quenching the second flow portion.

23. The apparatus of claim 20, wherein the retaining volume is configured to transfer the captured solids to the reactor.

24. The apparatus of claim 20, further comprising a regenerator, wherein the retaining volume is configured to transfer the captured solids to the reactor via the regenerator.

25. The apparatus of claim 20, wherein the at least one separator contained within the separation volume comprises a multi-stage cyclone separator.

* * * * *